United States Patent
Drobeck (10) Patent No.: US 6,843,164 B2
(45) Date of Patent: Jan. 18, 2005

(54) COFFEE BREWER

(75) Inventor: R. Gregory Drobeck, Columbus, OH (US)

(73) Assignee: Oasis Corporation, Columbus, OH (US)

( * ) Notice: Subject to any disclaimer, the term of this patent is extended or adjusted under 35 U.S.C. 154(b) by 0 days.

(21) Appl. No.: 10/682,309

(22) Filed: Oct. 8, 2003

(65) Prior Publication Data

US 2004/0112224 A1 Jun. 17, 2004

Related U.S. Application Data

(60) Provisional application No. 60/417,283, filed on Oct. 8, 2002.

(51) Int. Cl.[7] .................................................. A47J 31/00
(52) U.S. Cl. .............................. 99/280; 99/283; 99/295; 99/300; 99/304; 99/307
(58) Field of Search .................. 99/295, 299, 279–283, 99/300–307; 392/442, 449, 498, 451; 219/483, 482; 426/433

(56) References Cited

U.S. PATENT DOCUMENTS

| | | | | |
|---|---|---|---|---|
| 3,385,201 A | * | 5/1968 | Martin | 99/282 |
| 3,443,508 A | * | 5/1969 | Reynolds et al. | 99/282 |
| 4,222,320 A | * | 9/1980 | Castleberry | 99/281 |
| 4,354,427 A | * | 10/1982 | Filipowicz et al. | 99/307 |
| 4,413,552 A | * | 11/1983 | Daugherty | 99/295 |
| 4,476,775 A | * | 10/1984 | Daugherty | 99/295 |
| 4,478,139 A | * | 10/1984 | Zimmerman | 99/280 |
| 4,829,888 A | * | 5/1989 | Webster et al. | 99/284 |
| 4,867,048 A | * | 9/1989 | Brewer | 99/283 |
| 4,892,031 A | * | 1/1990 | Webster et al. | 99/284 |
| 5,064,533 A | * | 11/1991 | Anson | 210/232 |
| 5,287,797 A | * | 2/1994 | Grykiewicz et al. | 99/295 |
| 6,260,476 B1 | * | 7/2001 | Pope | 99/323 |

* cited by examiner

Primary Examiner—Timothy F. Simone
(74) Attorney, Agent, or Firm—Kelly Lowry & Kelley, LLP (57) ABSTRACT

An improved coffee brewer is provided for rapid and consistent high quality brewing of coffee. The coffee brewer includes a control panel for initiating a brew cycle wherein a metered volume of hot water is delivered from an insulated water reservoir via a spray head to mix with coffee grounds contained within a filter-lined brew basket, with the resultant brewed coffee draining into an underlying pot preferably such as an insulated carafe. The control panel is further operable for precision calibration of the metered water volume delivered to the brew basket for each brew cycle. In addition, the coffee brewer incorporates a removable rail unit for supporting the brew basket, wherein the rail unit and spray head are removable quickly and easily disassembled for periodic cleaning.

29 Claims, 5 Drawing Sheets

COFFEE BREWER

This application claims the benefit of U.S. Provisional Application No. 60/417,283, filed Oct. 8, 2002.

BACKGROUND OF THE INVENTION

This invention relates generally to improvements in devices and systems for brewing coffee or the like. More particularly, this invention relates to an improved coffee brewer machine designed for quick and easy set up calibration for consistent dispensing of a predetermined metered volume of hot water during each brew cycle. In addition, this invention relates to an improved coffee brewer machine designed for quick and easy removal of selected components thereof for facilitated and periodic cleaning.

Coffee brewers are generally known in the art for drip process brewing of hot coffee in a commercial environment such as in an office or the like. Such coffee brewers typically include a hot water reservoir which may be coupled to a tap water supply, and from which a controlled volume of hot water is delivered to an upwardly open brew basket having a porous filter containing a quantity of ground coffee mounted therein. The hot water intermixes with the coffee grounds to produce the desired coffee beverage which drains from the brew basket into an underlying coffee pot or decanter. In a common arrangement, the coffee pot is formed from a heat resistant glass and is supported on a hot plate to maintain the brewed coffee at a selected elevated temperature.

The volume of hot water dispensed by the coffee brewer during each brew cycle is adjustably set, typically by service or installation personnel, in accordance with the unique parameters and preferences of each site of use. In this regard, different customers will prefer coffee brewed at different strengths, and at different volumes. In addition, since the volume of water dispensed for each brew cycle is normally controlled by a timer used to open and close a solenoid-type valve, the actual volume of water dispensed during a timed cycle can vary appreciably in accordance with local water pressure. Thus, during initial set up or calibration, service personnel will typically set the timer for an interval representing an approximate volume of water to be dispensed, and then operate the coffee brewer for several brew cycles while adjusting the timer by trial and error until the desired dispensed volume is obtained. This set up calibration procedure can be undesirably time consuming, and does not preclude subsequent volumetric variations in the event of subsequent water supply pressure fluctuations.

In addition, coffee brewers routinely encounter a build-up of oil-based residue particularly on the coffee pot, as well as on the brew basket and adjoining surfaces of a machine housing. Such residue is unsightly and unattractive, and also can detract from the desirable fresh flavor of brewed coffee. It is therefore highly desirable to clean and remove such residue on a periodic basis. With prior coffee brewers, however, surfaces adjoining the brew basket are typically hard to reach and access for effective cleaning. Moreover, when a glass coffee pot is used, cleaning thereof is accompanied by a risk of glass breakage and associated safety hazard, in addition to requiring a replacement coffee pot before use of the coffee brewer can be resumed.

The present invention provides an improved coffee brewer designed for rapid and easy set up calibration to deliver an accurately metered volume of hot water during each brew cycle, substantially independent of variations in local water pressure. The present invention further provides an improved coffee brewer having removable quickly and easily removable components for facilitated periodic cleaning.

SUMMARY OF THE INVENTION

In accordance with the invention, an improved coffee brewer is provided for rapid and consistent high quality brewing of coffee in a commercial environment such as in an office or the like, or in a residential environment. The coffee brewer incorporates a precision calibration or set up mode for quickly and easily calibrating a metered volume of hot water to be delivered via a spray head to a brew basket during each brew cycle. In addition, the coffee brewer includes a removable rail unit for supporting the brew basket in association with the spray head, wherein the rail unit and spray head are quickly and easily removable for periodic cleaning.

The coffee brewer comprises an insulated water reservoir coupled to a suitable water supply such as a tap water supply or the like. A heating element maintains the water within the reservoir at a selected elevated temperature. The metered volume of hot water is delivered on each brew cycle through the spray head into brew basket containing a quantity of ground coffee typically supported in a porous filter liner. The hot water intermixes with the coffee grounds to produce brewed coffee which drains from the brew basket through one or more drip ports into an underlying coffee pot or decanter preferably such as an insulated carafe. The insulated carafe maintains the coffee in a heated and substantially fresh state for an extended period of time, without requiring a hot plate to maintain coffee temperature.

A control panel mounted on a housing of the coffee brewer includes one or more control buttons or the like for quick and easy operation. In accordance with one aspect of the invention, the control panel is operable in association with a main power switch mounted, for example, on a rear side of the brewer housing, for initiating a set up calibration mode used for controllably selecting the precise metered volume to be dispensed on each brew cycle. More particularly, with the main power switch in an "off" position, a "brew" button on the control panel is depressed and held while the main power switch is turned "on". Then, with a measuring pitcher placed beneath the spray head, and with the brew basket removed, the "brew" button is depressed once to start water flow to the spray head and a second time to stop such water flow when the measuring pitcher fills to the desired dispensed volume. The coffee brewer will thereafter dispense a metered volume of hot water for each brew cycle to produce the same volume of brewed coffee, with the actual dispensed water volume being increased by a factor of about 10% to account for residual water remaining within the coffee grounds at the conclusion of each brew cycle.

In accordance with a further aspect of the invention, the removable rail unit supports the brew basket for slide-in and slide-out placement beneath the spray head. In a preferred form, the rail unit is removably mounted on the brewer housing as by quarter-turn or snap-fit attachment or the like of a spray head cap onto the spray head. If and when accumulated coffee residue makes it desirable to clean the rail unit, the rail unit and associated spray head cap can be separated quickly and easily from the housing for appropriate cleaning and/or replacement. Similarly, with the rail unit removed, the spray head can also be removed as by unthreading from the downstream end of a dispense conduit for appropriate cleaning and/or replacement.

Other features and advantages of the invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
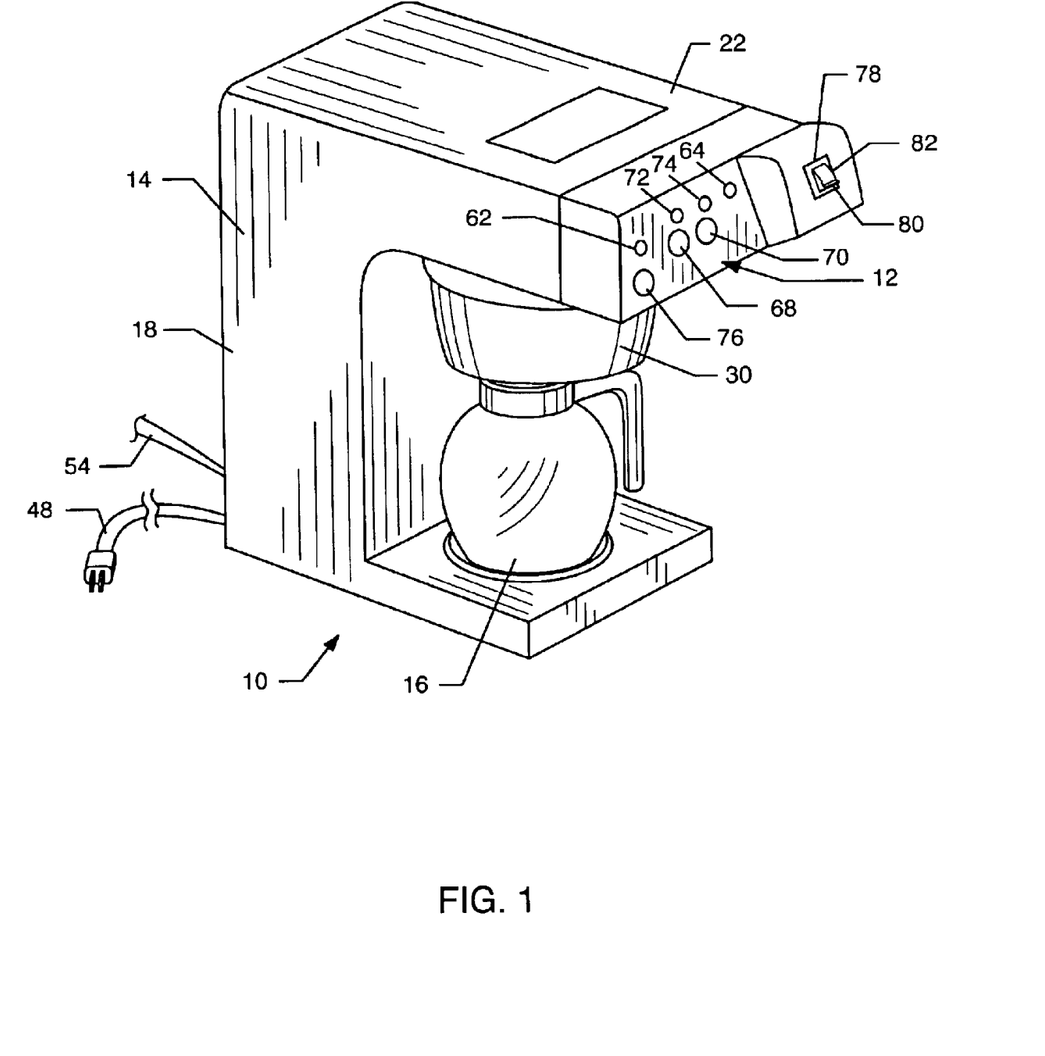
FIG. 1 is a perspective view illustrating a coffee brewer in accordance with the present invention.

As shown in the exemplary drawings, a coffee brewer referred to generally in FIG. 1 by the reference numeral 10 is provided for rapid and consistent high quality brewing of coffee in a commercial environment such as in an office or the like, or in a residential environment. The coffee brewer 10 includes a control panel 12 located on the front of a brewer housing 14 for selectively operating the machine to produce fresh brewed coffee that is collected within a coffee pot or decanter 16. In accordance with improved features of the coffee brewer 10, the control panel 12 can be operated in a set up calibration mode for precision calibration of a metered volume of hot water to be dispensed during each brew cycle. In addition, key components of the coffee brewer 10 are quickly and easily disassembled from the housing 14 to facilitate periodic cleaning thereof.

Figure 7:
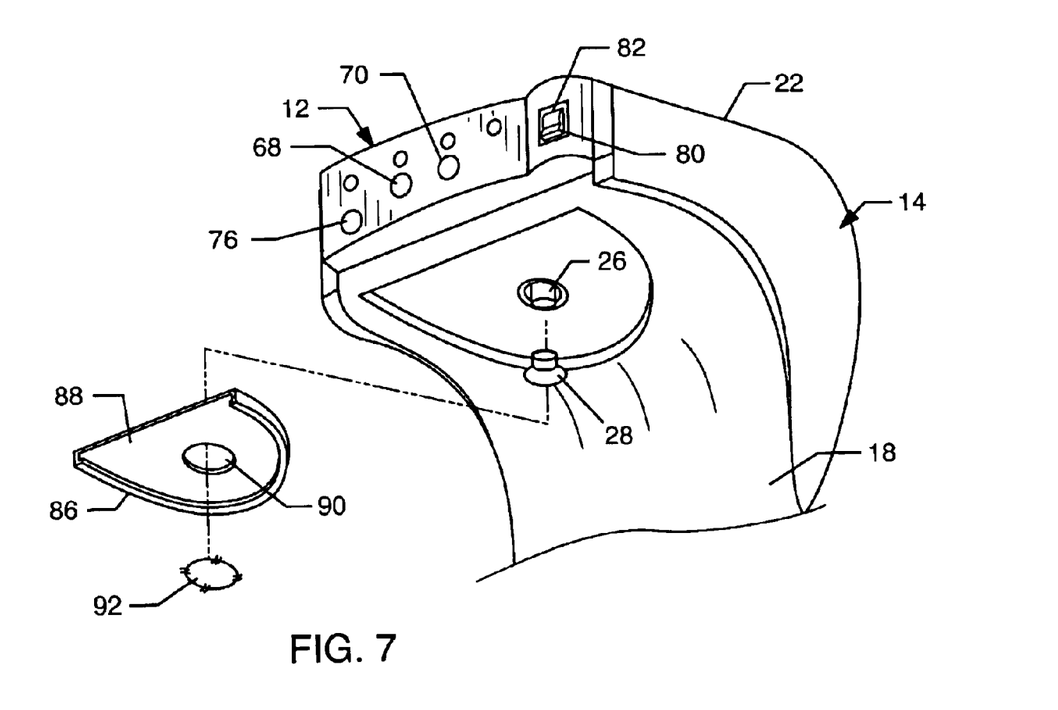
FIG. 7 is an enlarged fragmented and partially exploded perspective view illustrating disassembly of the rail unit and spray head components from the coffee brewer housing.

The coffee brewer 10 is shown in FIG. 1 with the brewer housing 14 having a relatively compact size and shape suitable for countertop or similar installation. The brewer housing 14 generally comprises an upstanding rear section 18 having a hot water reservoir 20 (FIG. 2) mounted therein. A head section 22 of the housing 14 (FIG. 1) protrudes forwardly from the housing rear section 18 to overlie the coffee pot 16 which is positioned upon a lower housing base 24. The control panel 12 is located in a conveniently accessible position on the front of the housing head section 22 and includes appropriate pushbutton or similar actuation devices or switches for operating the machine, and, in particular, for initiating a brew cycle for brewing a pot of coffee. In this regard, upon initiation of a brew cycle, a metered volume of hot water is delivered from the reservoir 20 through an appropriate dispense conduit 26 (FIG. 2) to a spray head 28 mounted at the underside of the housing head section 22 (FIG. 7). The spray head 28 delivers the hot water into a slidably removable and upwardly open brew basket 30 (shown best in FIG. 2) containing a quantity of ground coffee 32 within a porous, typically paper-based filter liner 34 or the like. Within the brew basket 30, the hot water floods and intermixes with the coffee 32, to produce fresh brewed coffee that drains in a drip fashion through one or more drip ports 36 into the underlying coffee pot 16.

Figure 2:
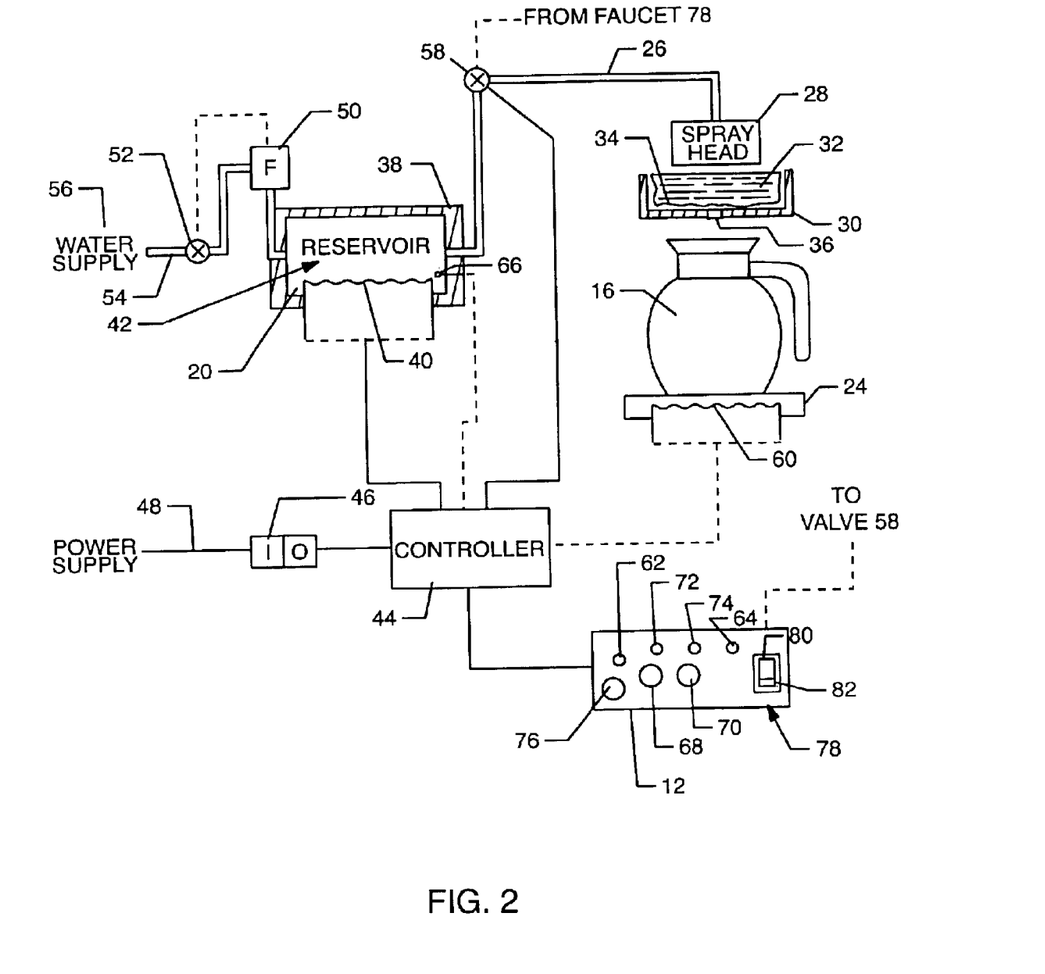
FIG. 2 is a schematic diagram depicting hydraulic and electronic components of the coffee brewer of FIG. 1.
Figure 3:
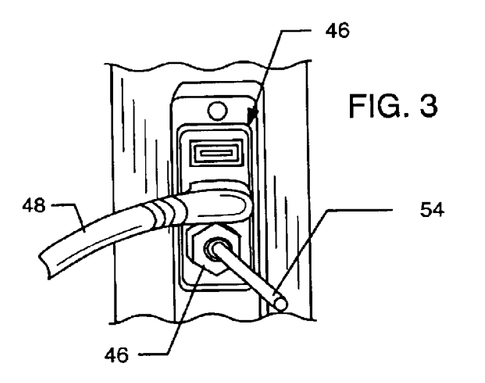
FIG. 3 is an enlarged fragmented rear elevation view of a portion of a housing of the coffee brewer, showing manipulation of a main on-off switch mounted thereon.

FIG. 2 illustrates the coffee brewer in schematic form to show the hot water reservoir 20 encased within suitable insulation 38, and with a heating element 40 in thermal communication with water 42 contained within the reservoir 20. A controller 44 is connected via a main power switch 46 (located on a rear side of the housing 14, as viewed in FIG. 3) and a power cord 48 to a suitable source of electric power such as a conventional wall outlet. The water level within the insulated reservoir is regulated by a float system 50 of the type shown and described in U.S. Pat. Nos. 6,062,255 and 6,089,258, both of which are incorporated by reference herein, wherein this float system is shown (FIG. 2) mounted in a holding reservoir located upstream from the hot water reservoir 20. The float system 50 controllably opens and closes an inlet valve 52 for inflow of water to the reservoir 20 via a water supply conduit 54 having its upstream end coupled to a suitable water supply 56, such as a tap water supply, or alternately to the output of a water purification system including filtration and/or reverse osmosis components. One exemplary water purification system of this type is shown and described in copending U.S. Ser. No. 10/092, 838, which is also incorporated by reference herein.

The insulated reservoir 20 is coupled by the dispense conduit 26 to the spray head 28, as previously described. A dispense valve 58 is mounted along this dispense conduit 26 and is operably regulated by the controller 44 to deliver a metered volume of hot water through the spray head 28 and into the brew basket 30 during each brew cycle. The controller 44 may also be linked to and regulate the operation of a heating element 60 (FIG. 2) mounted within the housing base 24 for maintaining the temperature of brewed coffee within the pot 16 rested thereon. However, in accordance with a preferred form of the invention, this second heating element 60 is omitted and a coffee pot 16 in the form of an insulated carafe is used. Such insulated carafe will maintain brewed coffee in a heated state, and with a substantially fresh taste or character, for an extended period of time. In addition, such insulated carafe may be constructed with an outer shell of an unbreakable material, such as stainless steel or the like.

The control panel 12 on the front of the brewer housing 14 provides convenient and simple operation of the machine. More particularly, as viewed best in FIGS. 2 and 4, the control panel 12 includes a power indicator light 62 which is illuminated by the controller 44 when the brewer 10 is connected to a source of electrical power with the main power switch 46 in an "on" position. The control panel 12 further includes a temperature indicator light 64 which is illuminated when the temperature of the hot water within the reservoir 20 is at a temperature suitable for brewing coffee, such as about 205–208° F. so that the water temperature is about 198–203° F. when the hot water contacts the coffee grounds for brewing. In this regard, the controller 44 receives an input signal from a temperature sensor 66 mounted directly within the hot water reservoir 20 to monitor the actual temperature of the hot water therein.

Figure 4:
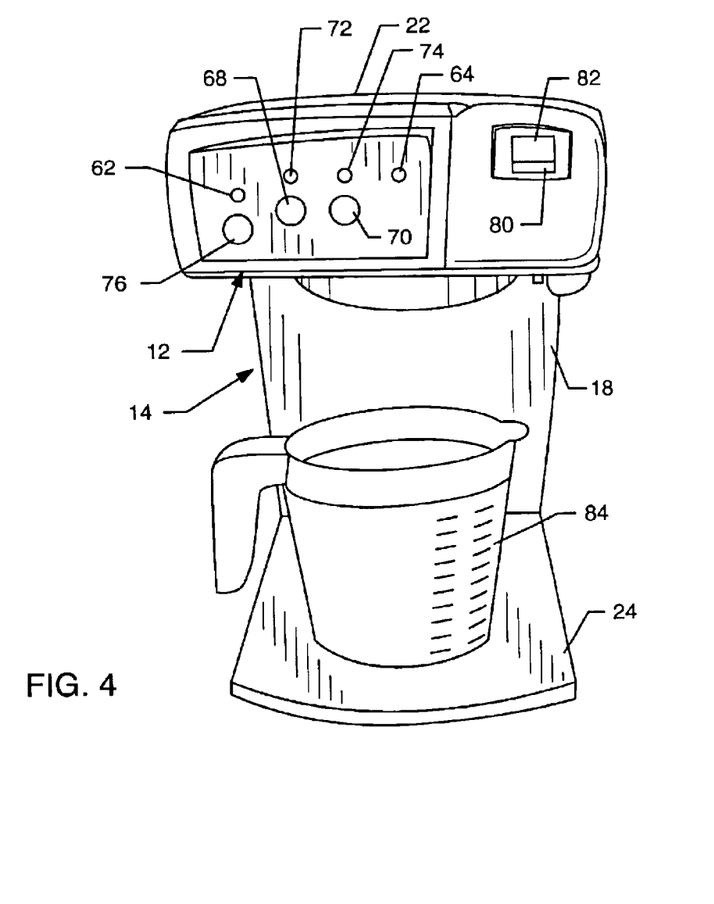
FIG. 4 is an enlarged front perspective view of the coffee brewer, with a metered calibration cup mounted thereon.

A pair of brew buttons 68 and 70 are also located on the control panel 12 for depression to initiate brew cycles. The brew button 68 comprises a "brew full" button for initiating a brew cycle in which a full pot of coffee is brewed, whereas the second brew button 70 comprises a "brew half" button for initiating a brew cycle wherein a half pot of coffee is brewed, all under the control and regulation of the controller 44. Each of these brew buttons 68 and 70 is associated with a respective indicator light 72 and 74 which is illuminated as by on-off blinking for the duration of the appropriate full or half brew cycle when the respective button 68, 70 is depressed. Finally, an "on/off" button 76 is also provided on the control panel 12 for interrupting or canceling a brew cycle, if desired.

The control panel 12 may additionally include a hot water dispenser 78 for manually operating the dispense valve 58 to dispense hot water for use in making tea, soup, and the like. In the preferred form, this hot water dispenser 78 comprises a safety mechanism including a safety latch 80 that is pushed downwardly by fingertip action or the like to release or unlatch an actuator button 82 which can then be pressed inwardly to open the dispense valve 58 and dispense hot water. Upon release of the actuator button 82, the valve 58 closed to halt hot water dispensing. On release of the safety latch 80, the actuator button 82 is locked against depression to correspondingly prevent inadvertent dispensing of hot water.

Figure 5:
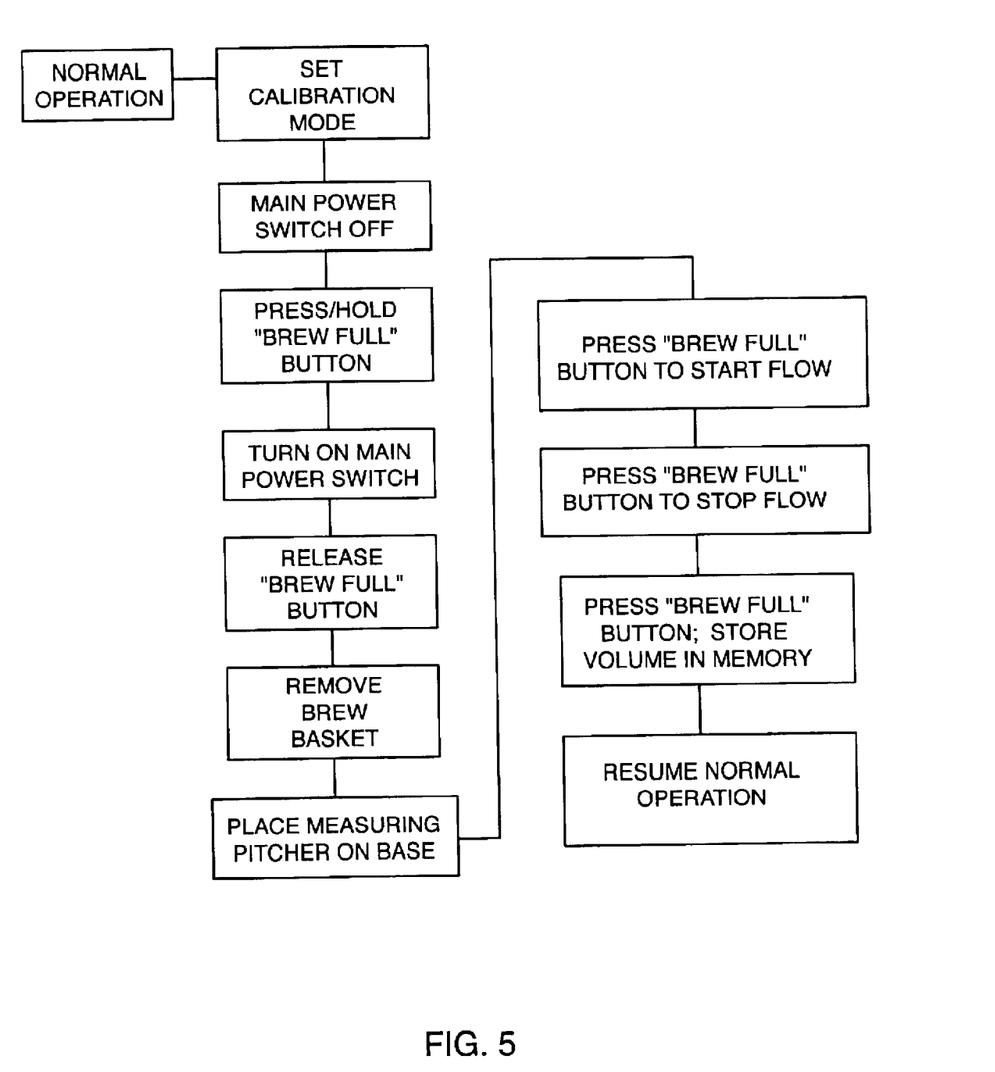
FIG. 5 is a flow chart representing a set-up sequence for calibrating a metered volume of hot water to be dispensed in the course of each brew cycle.

In accordance with one aspect of the invention, the controller 44 is programmed to enable manipulation of the control panel 12 to initiate the set up calibration mode wherein the volume of hot water delivered on each brew cycle is selectively and precision calibrated, as illustrated in the flow chart of FIG. 5. For normal operation, the brewer 10 is simply connected to a source of electrical power and the main power switch 46 is turned to the "on" position. To change to the set up calibration mode, the main power switch 46 (FIG. 2) on the rear of the housing 14 is turned to the "off" position. The "brew full" button 68 on the control panel 12 is then pressed and held while the main power switch 46 is moved back to the "on" position, and then released. The controller 44 is now set for the calibration mode. With the brew basket 30 removed from its normal position underlying the spray head 28, and a measuring pitcher 84 (FIG. 4) such as a graduated measuring vessel is placed onto the housing base 24 beneath the spray head 28. The "brew full" button 68 is pressed once to open the dispense valve 58 and begin dispensing water into the measuring pitcher 84. When the measuring pitcher 84 is filled with a selected and desired volume of water, typically on the order of about 60 ounces, the "brew full" button 68 is depressed a second time to stop the water flow. The "brew full" button 68 is then depressed again at which time the dispensed volume is recorded in the memory logic of the controller 44, and the controller automatically returns to the normal operation mode.

Thereafter, each time the "brew full" button 68 is depressed to initiate a brew cycle, the controller 44 operates the dispense valve 58 to dispense a precision metered volume of water via the spray head 28 to make fresh coffee. The actual metered volume as determined by the control logic of the controller 44, in accordance with the preferred form of the invention, is increased by a factor of about 10% over that dispensed into the measuring pitcher 84, to account for a residual amount of water remaining within and wetting the coffee grounds 22 each time a pot of coffee is brewed, so that the actual volume delivered to the coffee pot 16 conforms to the volume delivered to the measuring pitcher 84 during calibration. The "brew half" button 70, when depressed, operates the controller 44 to dispense half of the metered volume for brewing a half pot of coffee.

Figure 6:
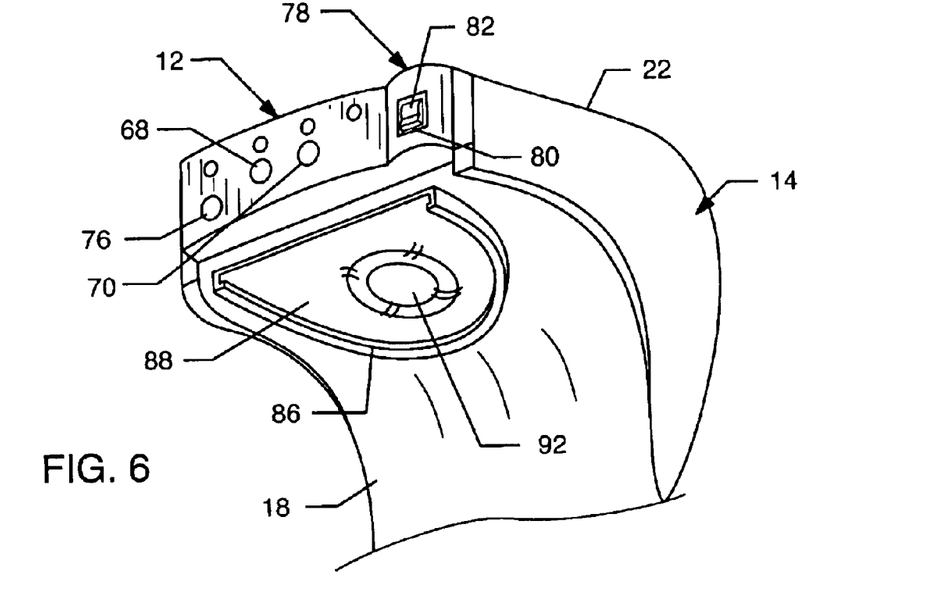
FIG. 6 is an enlarged fragmented perspective view showing a removable rail unit mounted on the coffee brewer housing.

In a further aspect of the invention, components of the brewer 10 are quickly and easily removable when desired for facilitated cleaning. In this regard, the brew basket 30 conventionally includes side wings (not shown) for slide-in installation and slide-out removal at the underside of the housing head section 22. The brew basket 30 is designed to engage a generally U-shaped slide rail 86 formed on a plate-shaped rail unit 88 mounted over the spray head 28 (as viewed best in FIGS. 6 and 7). This U-shaped slide rail 86 defines an appropriate support ledge for receiving and supporting the brew basket 30 in an easily removable manner. The rail unit 88 is conveniently formed from an injection molded plastic or the like and defines a relatively broad area structure surrounding the spray head 28, with a central port 90 formed therein for downward water passage therethrough. A cap 92 is adapted for quick release connection to the spray head 28, as by a quarter-turn or snap-fit connection, and functions to removably retain the plate-shaped rail unit 88 in a snugly nested position at the underside of the housing head 22.

If and when the rail unit 88 requires cleaning, as will occur by accumulated of oil-based coffee residue, the rail unit 88 is quickly and easily removed from the machine. That is, the spray head cap 92 is disassembled quickly and easily from the spray head 28 to release the rail unit 88, as shown in FIG. 7. The rail unit 88 can be washed, or, if desired, replaced. Moreover, the spray head 28 can also be removed from the downstream end of the dispense conduit 26, as by unthreading of the spray head therefrom, for similar cleaning or replacement. These components can be quickly and easily reassembled onto the brewer 10 for resumed normal operation.

A variety of modifications and improvements in and to the coffee brewer 10 of the present invention will be apparent to those persons skilled in the art. Accordingly, no limitation on the invention is intended by way of the foregoing description and accompanying drawings, except as set forth in the appended claims.

What is claimed is:

1. A coffee brewer, comprising:
   a brewer housing;
   a hot water reservoir carried by said housing;
   first means for coupling said reservoir to a water supply;
   a spray head carried by said housing;
   second means for coupling said reservoir to said spray head;
   a brew basket for receiving a quantity of ground coffee and removably carried by said housing for receiving hot water from said spray head to produce brewed coffee for drip flow dispensing from said brew basket into an underlying, upwardly open decanter; and
   a controller including a user-accessible control panel for operating the coffee brewer, and a memory logic;
   said controller including a set up calibration mode having calibration means for initiating water flow from said reservoir and through said spray head for dispensing into an underlying upwardly open vessel, and for terminating said water flow when a selected volume of water has been dispensed into the receptacle, and for storing said selected volume of water in said memory logic;
   said controller further including a normal operation mode having brew cycle means for dispensing said selected volume of water from said reservoir and through said spray head to produce brewed coffee.

2. The coffee brewer of claim 1 wherein said brewer housing comprises an upstanding rear section having said hot water reservoir mounted therein, a head section protruding forwardly from an upper end of said rear section and having said spray head mounted thereon for dispensing hot water downwardly therefrom.

3. The coffee brewer of claim 2 wherein said brewer housing further includes a base section protruding forwardly from a lower end of said rear section, said base section including means for supporting a coffee decanter.

4. The coffee brewer of claim 3 further including a heating element carried by said base section.

5. The coffee brewer of claim 2 wherein said control panel is mounted on said head section of said brewer housing.

6. The coffee brewer of claim 2 further including a slide rail carried by said head section for removably supporting said brewer basket.

7. The coffee brewer of claim 6 wherein said slide rail is formed on a plate-shaped rail unit, and further including a cap removably mounted onto said spray head for removably retaining said rail unit on said head section, said cap being removable from said spray head to permit removal of said rail unit from said head section for cleaning.

8. The coffee brewer of claim 1 further including a heating element for heating water within said reservoir.

9. The coffee brewer of claim 8 wherein said reservoir is insulated.

10. The coffee brewer of claim 8 further including a temperature sensor coupled to said controller for monitoring the temperature of water within said reservoir.

11. The coffee brewer of claim 10 wherein said control panel including indicator means for indicating that the temperature of water within said reservoir is suitable for brewing coffee.

12. The coffee brewer of claim 1 wherein said first coupling means comprises a water supply conduit connected between said reservoir and a water supply, an inlet valve mounted along said water supply conduit, and a float system for regulating said inlet valve to maintain the water level within said reservoir.

13. The coffee brewer of claim 1 wherein said second coupling means comprises a dispense conduit connected between said reservoir and said spray head, and a dispense valve mounted along said dispense conduit, said controller regulating said dispense valve in said set up calibration and normal operation modes.

14. The coffee brewer of claim 13 further including means for manually regulating said dispense valve for selectively dispensing water from said hot water reservoir.

15. The coffee brewer of claim 1 wherein said controller includes means for dispensing said selected volume of water plus a predetermined incremental additional volume of water in said normal operation mode.

16. The coffee brewer of claim 15 wherein said predetermined incremental additional volume of water comprises about 10% of said selected volume of water.

17. The coffee brewer of claim 1 wherein said controller includes, during said normal operation mode, first brew cycle means for dispensing said selected volume of water for a "full" brew cycle, and second brew cycle means for alternatively dispensing approximately one-half of said selected volume of water for a "half" brew cycle.

18. The coffee brewer of claim 17 further including first indicator means for indicating that said "full" brew cycle is in progress, and second indicator means for indicating that said "half" brew cycle is in progress.

19. The coffee brewer of claim 1 wherein said control panel includes means for interrupting said brew cycle means.

20. The coffee brewer of claim 1 further including an upwardly open decanter for receiving brewed coffee.

21. A coffee brewer, comprising:
a brewer housing;
a hot water reservoir carried by said housing;
first means for coupling said reservoir to a water supply, said first coupling means comprises a water supply conduit connected between said reservoir and a water supply, an inlet valve mounted along said water supply conduit, and a float system for regulating said inlet valve to maintain the water level within said reservoir;
a spray head carried by said housing;
second means for coupling said reservoir to said spray head, said second coupling means comprises a dispense conduit connected between said reservoir and said spray head, and a dispense valve mounted along said dispense conduit;
a brew basket for receiving a quantity of ground coffee and removably carried by said housing for receiving hot water from said spray head to produce brewed coffee for drip flow dispensing from said brew basket into an underlying, upwardly open decanter; and
a controller including a user-accessible control panel for operating the coffee brewer, and a memory logic;
said controller including a set up calibration mode having calibration means for regulating said dispense valve to initiate water flow from said reservoir and through said spray head for dispensing into an underlying upwardly open vessel, and for terminating said water flow when a selected volume of water has been dispensed into the receptacle, and for storing said selected volume of water in said memory logic;
said controller further including a normal operation mode having brew cycle means for regulating said dispense valve to dispense said selected volume of water from said reservoir and through said spray head to produce brewed coffee.

22. The coffee brewer of claim 21 further including a slide rail carried by said head section for removably supporting said brewer basket.

23. The coffee brewer of claim 22 wherein said slide rail is formed on a plate-shaped rail unit, and further including a cap removably mounted onto said spray head for removably retaining said rail unit on said head section, said cap being removable from said spray head to permit removal of said rail unit from said head section for cleaning.

24. The coffee brewer of claim 21 wherein said reservoir is insulated, and further including a heating element for heating water within said reservoir.

25. The coffee brewer of claim 24 further including a temperature sensor coupled to said controller for monitoring the temperature of water within said reservoir.

26. The coffee brewer of claim 21 wherein said controller includes means for dispensing said selected volume of water plus a predetermined incremental additional volume of water in said normal operation mode.

27. The coffee brewer of claim 21 wherein said controller includes, during said normal operation mode, first brew cycle means for dispensing said selected volume of water for a "full" brew cycle, and second brew cycle means for alternatively dispensing approximately one-half of said selected volume of water for a "half" brew cycle.

28. A coffee brewer, comprising:
a brewer housing having an upstanding rear section, and a head section protruding forwardly from an upper end of said rear section;
a hot water reservoir carried by said housing rear section;
first means for coupling said reservoir to a water supply;
a spray head carried by said housing head section generally at an underside surface thereof;

second means for coupling said reservoir to said spray head;

a plate-shaped rail unit including a slide rail;

a cap removably connected to said spray head for removably retaining said rail unit generally at said underside surface of said head section; and a brew basket removably supported by said slide rail, said brew basket being for receiving a quantity of ground coffee and for receiving hot water from said spray head to produce brewed coffee for drip flow dispensing from said brew basket into an underlying, upwardly open decanter;

said cap being removable from said spray head to permit removal of said rail unit from said head section for cleaning.

29. The coffee brewer of claim 28 wherein said second coupling means includes a dispense conduit, said spray head being removably mounted onto said dispense conduit.

* * * * *